United States Patent
Bussolotti et al.

(10) Patent No.: US 7,810,209 B2
(45) Date of Patent: Oct. 12, 2010

(54) SELF-PROPELLED SWEEPER INCLUDING A FRONT STEERING AXLE

(75) Inventors: Dario Bussolotti, Carpi (IT); Frumenzio Salati, Correggio (IT)

(73) Assignee: Unieco Costruzioni Meccaniche S.R.L., Rio Saliceto (IT)

( * ) Notice: Subject to any disclaimer, the term of this patent is extended or adjusted under 35 U.S.C. 154(b) by 1059 days.

(21) Appl. No.: 10/558,046

(22) PCT Filed: May 26, 2003

(86) PCT No.: PCT/IT03/00321
§ 371 (c)(1),
(2), (4) Date: Sep. 18, 2006

(87) PCT Pub. No.: WO2004/103801
PCT Pub. Date: Dec. 2, 2004

(65) Prior Publication Data
US 2007/0163071 A1    Jul. 19, 2007

(51) Int. Cl.
E01H 1/08    (2006.01)
(52) U.S. Cl. .................................. 15/340.1; 15/319
(58) Field of Classification Search ..... 15/340.1–340.4, 15/319, 78, 98; 180/211, 213–216, 409
See application file for complete search history.

(56) References Cited

U.S. PATENT DOCUMENTS

| | | | |
|---|---|---|---|
| 2,932,845 A * | 4/1960 | Rydberg | 15/346 |
| 3,688,306 A | 8/1972 | Oishi et al. | |
| 4,343,060 A * | 8/1982 | Hildebrand et al. | 15/84 |
| 5,347,458 A | 9/1994 | Serizawa et al. | |
| 5,485,653 A * | 1/1996 | Knowlton et al. | 15/340.4 |
| 5,802,665 A | 9/1998 | Knowlton et al. | |
| 5,890,558 A * | 4/1999 | Keegan | 180/211 |
| 6,076,626 A | 6/2000 | Bohner et al. | |
| 6,212,731 B1 * | 4/2001 | Eckerlein et al. | 15/320 |

(Continued)

FOREIGN PATENT DOCUMENTS

EP    1 164 074 A2    6/2001

(Continued)

OTHER PUBLICATIONS

International Search Report (PCT/IT03/00321) mailed Jun. 8, 2004.

*Primary Examiner*—Dung Van Nguyen
(74) *Attorney, Agent, or Firm*—McGinn IP Law Group, PLLC

(57) ABSTRACT

The self-propelled sweeper with electrical steering comprises a frame suitable for receiving the refuse container (13), waste collection and suction members (2; 4, 6), a suction and filtering unit, a driving position in the cabin (16) of the machine equipped with steer control members, and has the steer actuator of these members consisting of an electric motor (22). The sweeper also has the front steering axle (5) supported by arms of the suspension (20, 21) of which the upper ones (21) are arranged at a higher level than the maximum height of the wheel (18) of the same axle, the steer linkages (24, 25, 28) are also arranged at said upper-level; in the same way the lower arms (20) are shaped to receive said inner wheel in the position of maximum curvature; moreover, said container (13) is housed on a U-shaped plan rear axle (9).

13 Claims, 7 Drawing Sheets

U.S. PATENT DOCUMENTS

2003/0010545 A1    1/2003    Takeuchi

FOREIGN PATENT DOCUMENTS

| | | |
|---|---|---|
| EP | 1 219 525 A2 | 12/2001 |
| GB | 2 382 056 A | 11/2001 |
| WO | WO 01/81235 A1 | 4/2001 |
| WO | WO 03/010040 A1 | 7/2002 |

* cited by examiner

SELF-PROPELLED SWEEPER INCLUDING A FRONT STEERING AXLE

The invention concerns a self-propelled sweeper with electric steering and relative control system, or else a power-operated machine for use on streets or expansive surfaces, covered or not, for cleaning them and for collecting dirt and other materials present on said surfaces. The operator is present on the sweeper to guide it where necessary for the aforementioned cleaning.

The state of the art comprises various types of self-propelled motorized sweepers, equipped with a unit for sucking up dirt as well as with a tank for collecting the material sucked up. Generally, these sweepers are large in size and thus it is difficult to use them in narrow areas. Therefore, in the cleaning of narrow areas or even in areas with tight curves they are difficult to use.

In the state of the art patent application EP A 1164074 is known, which describes a small dimension sweeper which has a frame equipped with a central pivot so as to allow the sweeper to go around corners. Moreover, the central pivot prevents the space in the machine being fully exploited and, indeed, at the sides of the pivot there are two bevels of the bodywork of the machine to allow the pivot to be drawn together in steering rotation: in this way the use of the space is incomplete; the steering can take place only for the size of rotation of the pivot; in steering the two parts, one on the front axle and the other on the rear axle, rotate pivoting on its own axis displacing the parts connected to the respective frame part sideways. In conclusion, the machine is not very versatile.

In the prior art, moreover, it is known to use hydraulic steering apparatuses in power-operated machines, which if used in sweepers make the drivers cabin uncomfortable both due to possible oil leaks from ducts and due to the high heat released from the pipes and components with hydraulic oil. Moreover, a fairly widespread requirement for users of sweepers is the reduction in the maintenance interventions and in the maintenance cost itself.

Such a state of the art is susceptible to substantial improvements with regard to the possibility of realizing a self-propelled sweeper which allows steering in the small dimensions required even in narrow spaces without occupying wide areas of the side of the machine in steering, also allowing medium capacity tanks to be used to store the material collected, substantially improving the capacity of analogous sweepers of the prior art.

From the above arises the need to solve the technical problem of finding an arrangement of the parts of the machine and particularly of the steering and frame such as to allow the assembly of the members of the machine keeping the outer dimensions as low as possible, so as to be able to use it in closed spaces. A further purpose of the present invention is to realize the motorization electrically powered, both the traction and for the steering, to reduce the maintenance interventions and costs. Last but not least is the purpose of realizing the control system for the steering and the traction electrically, thus easing the automated control of the actions before the usual intervention of the operator.

The invention solves a first aspect of the aforementioned technical problem adopting: a self-propelled sweeper comprising a frame suitable for receiving the refuse container, waste collection and suction members, a suction and filtering unit, members for steering the sweeper, a driving position in the cabin of the machine equipped with steer control members, characterized in that it has the front steering axle supported by arms of the suspension of which the upper ones are arranged at a higher level than the maximum height of the wheel of the same axle, to allow the rotation of the inner wheel when cornering beyond the right-angle; the steer linkages also being arranged at said upper level; in the same way the lower arms are shaped to receive said inner wheel in the position of maximum curvature; moreover, said container being housed on the rear axle supported at engagement and attachment members to said suction and filtering unit; said rear axle having a U-shaped plan for receiving said refuse container directly from the floor. Advantageously, the frame which joins the front axle and the rear axle is box-shaped with a central beam.

Moreover, by adopting, in a further preferred embodiment: in said front axle a supporting structure rigidly connected to this frame to support said upper arms of the suspension and to allow the passage of the suction tube from the lower suction mouth to the upper suction and filtering unit.

Furthermore, by adopting, in a further preferred embodiment: said rear axle realized with oscillating arms for supporting the wheels connected in oscillation to the frame through torsion bars, advantageously housed in the oscillation pin itself.

By adopting, moreover, in a further preferred embodiment: the rear axle equipped with individual traction motors for each wheel.

The invention solves a second aspect of the aforementioned technical problem by adopting: a self-propelled sweeper with electric steering: comprising a frame suitable for receiving the refuse container, waste collection and suction members, a suction and filtering unit, members for steering the sweeper, a driving position in the cabin of the machine equipped with steer control members, characterized in that it has the steer actuator of these members consisting of an electric motor connected to said control members through a control station for the steering itself with the function of actuating and controlling the steering.

Moreover, by adopting, in a further preferred embodiment: said connection between the steer control members and said control station with a connection with a double sensor and double connection cables arranged on physically different paths, mechanically shielded and protected from possible damage.

Furthermore, by adopting, in a further preferred embodiment: the steering control station consisting of two microprocessors of which one is only for actuation and one is only for checking and monitoring the command and its effect, with at least one feedback sensor on said motor or on the steer rotation shaft, to realize open loop control.

Moreover, by adopting, in a further preferred embodiment: the control station of the steering connected with two connection lines, actuated one by said actuation microprocessor and the other by the checking and monitoring microprocessor, to the safety switches foreseen in the traction control circuit, to act upon the braking members of these traction motors and to ensure correct emergency braking in blocking, error or emergency actions of the steering control circuit.

Furthermore, by adopting, in a further preferred embodiment: said traction motors of the electrical type, each equipped with a rotation and electromagnetic braking sensor.

Moreover, by adopting, in a further preferred embodiment: said steer actuation motor consisting of an ac motor controlled in frequency and current by said actuation microprocessor.

Furthermore, by adopting, in a further preferred embodiment: said electrical traction motors of the type in three-phase alternating current controlled in frequency and current by the individual electronic control stations for each motor.

Moreover, by adopting, in a further preferred embodiment: said electronic control stations of each traction motor each consisting of two microprocessors of which one is only for actuation and one is only for monitoring and checking the command and its effect, with at least one feedback sensor on said traction motor, to realize open loop control.

Furthermore, by adopting, in a further preferred embodiment: a stepper motor with a permanent magnet on the rotor and a double pair of stator windings physically staggered by a right angle to constitute the generator of control signals for said steer control members; each pair of stator windings being connected to one of said double connection cables with the steer control station.

The invention solves a third aspect of the aforementioned technical problem by adopting an electrical steering unit for self-propelled vehicles comprising: members for steering the vehicle, a driving position equipped with steer control members, actuation and control devices of the steering members, characterized in that it has the steer actuator of these members consisting of an electric motor connected to said control members through a control station for the steering itself with the function of actuating and controlling the steering.

Moreover, by adopting, in a further preferred embodiment: said connection between the steer control members and said control station with a connection with a double sensor and double connection cables arranged on physically different paths, mechanically shielded and protected from possible damage.

Furthermore, by adopting, in a further preferred embodiment: the control station of the steering consisting of two microprocessors of which one is only for actuation and one is only for monitoring and checking the command and its effect, with at least one feedback sensor on said motor or on the steer rotation shaft, to realize open loop control.

Moreover, by adopting, in a further preferred embodiment: the control station of the steering connected with two connection lines, actuated one by said actuation microprocessor and the other by the checking and monitoring microprocessor, to the safety switches foreseen in the traction control circuit, to act upon the braking members of these traction motors and to ensure correct emergency braking in blocking, error or emergency actions of the steering control circuit.

Furthermore, by adopting, in a further preferred embodiment: said traction motors of the electrical type, each equipped with a rotation and electromagnetic braking sensor.

Moreover, by adopting, in a further preferred embodiment: said steer actuation motor consisting of an alternating current motor controlled in frequency and current by said actuation microprocessor.

Finally, by adopting, in a further preferred embodiment: a stepper motor with a permanent magnet on the rotor and a double pair of stator windings physically staggered by a right angle to constitute the generator of control signals for said steer control members; each pair of stator windings being connected to one of said double connection cables with the steer control station.

A way of carrying out the invention is illustrated, purely as an example, in the seven attached tables of drawings, in which.

Figure 1:
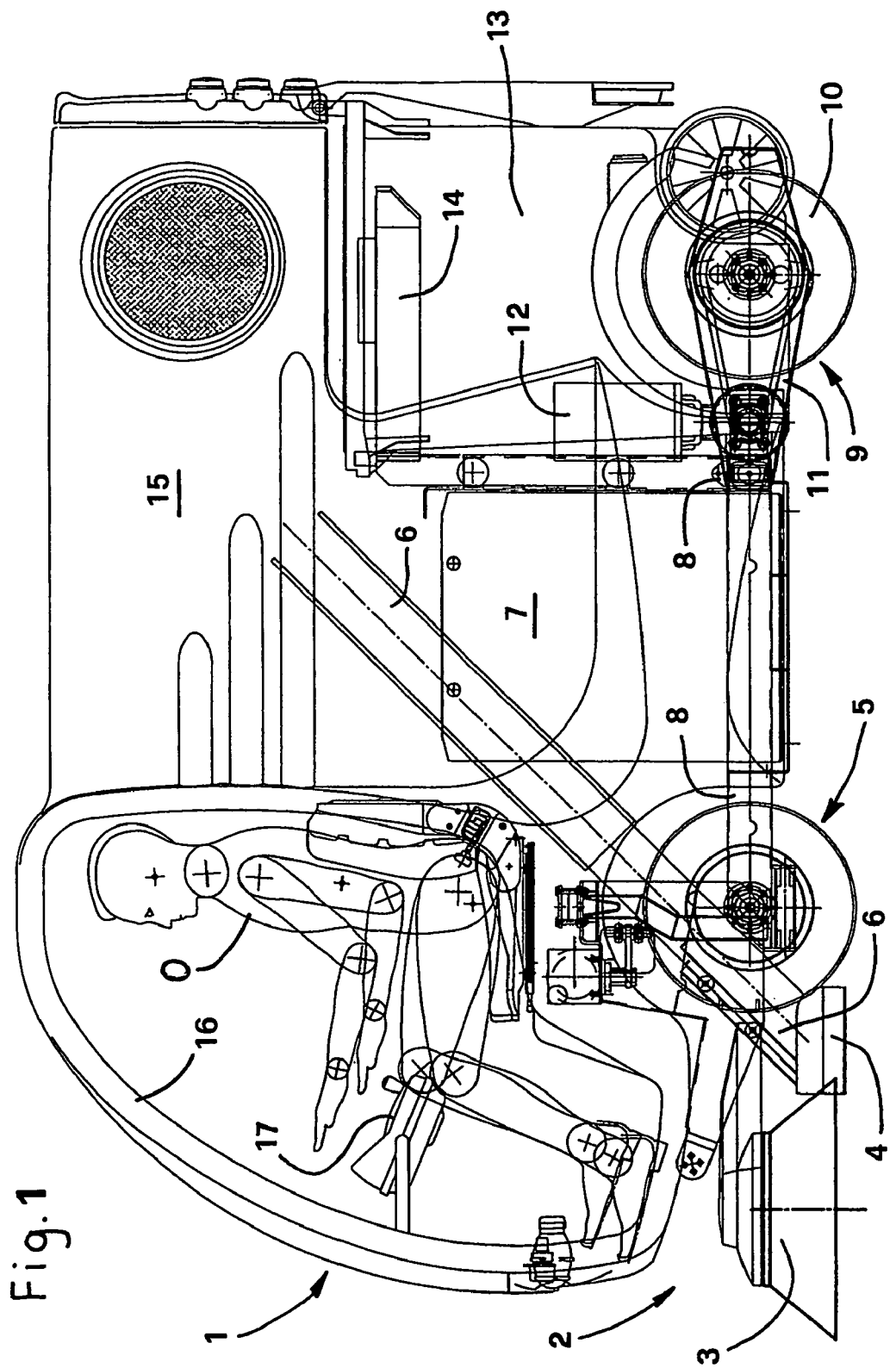
FIG. 1 is a schematic side view of the self-propelled sweeper according to the present invention.

FIG. 1 indicates the sweeper 1 equipped with collection members 2 with rotating brushes 3 and a suction mouth 4 in the front part: the operator O sits on the front steering axle 5, and the suction tube 6 crosses the members of said front axle 5 in an inclined direction and passes into the inner space between the electrical battery packs 7; the box-shaped frame 8 joins the front axle 5 and the rear axle 9 consisting of wheels 10 connected to said frame 8 with single oscillating arms 11, said wheels being mechanically connected in rotation with an electrical traction motor 12 at each side; the tank 13 for storing the collected material being housed between these wheels 10 of the rear axle 9, raised and locked by the lifter 14. The upper part of the bodywork 15 houses the suction and filtering apparatus, not depicted here, whereas the cabin 16 is equipped with the steering wheel 17 for the electrical control of the steering.

Figure 2:
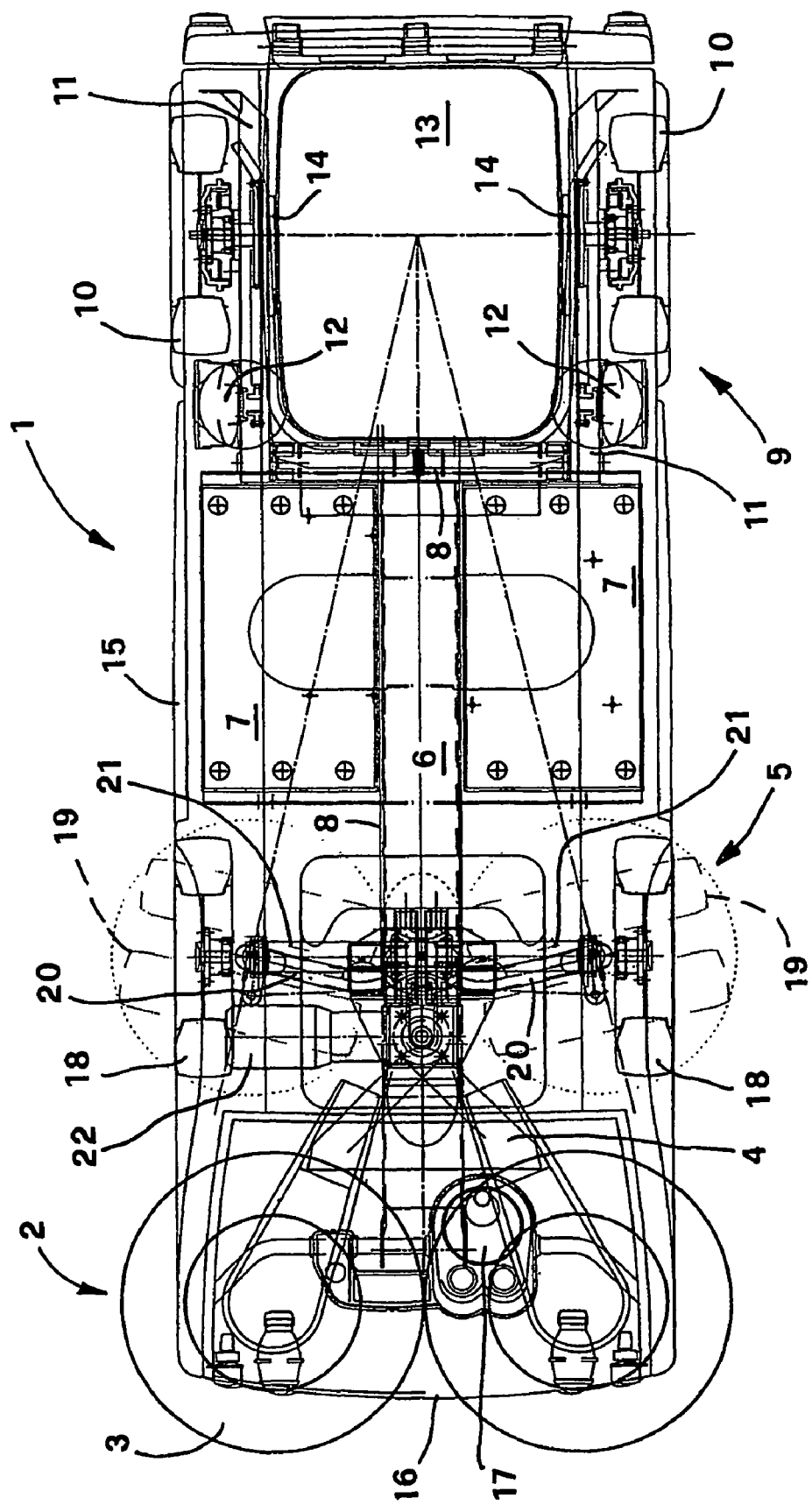
FIG. 2 is a schematic plan view of the self-propelled sweeper of the previous Figure.

In FIG. 2 it is also possible to see the wheels 18 of the front steering axle with the maximum steering rotation 19, the lower arms 20 shaped to receive the wheels 18 at the maximum foreseen steering, the upper arms 21 and the electric motor 22 for actuating this steer.

Figure 3:
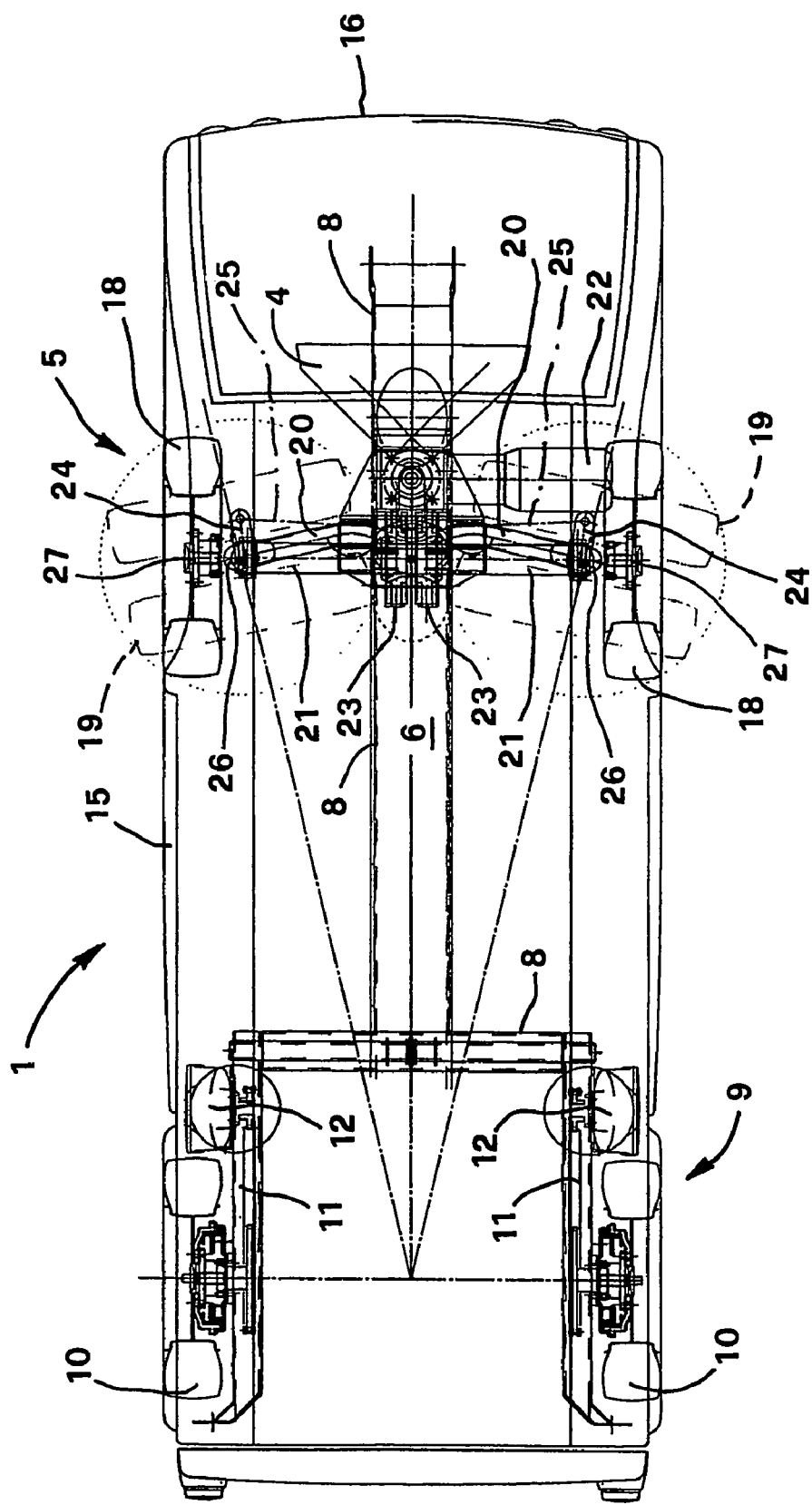
FIG. 3 is a schematic plan view of the sweeper limited to the frame, to the suction mouth and to the relative duct as well as to the outer bodywork of the machine.
Figure 4:
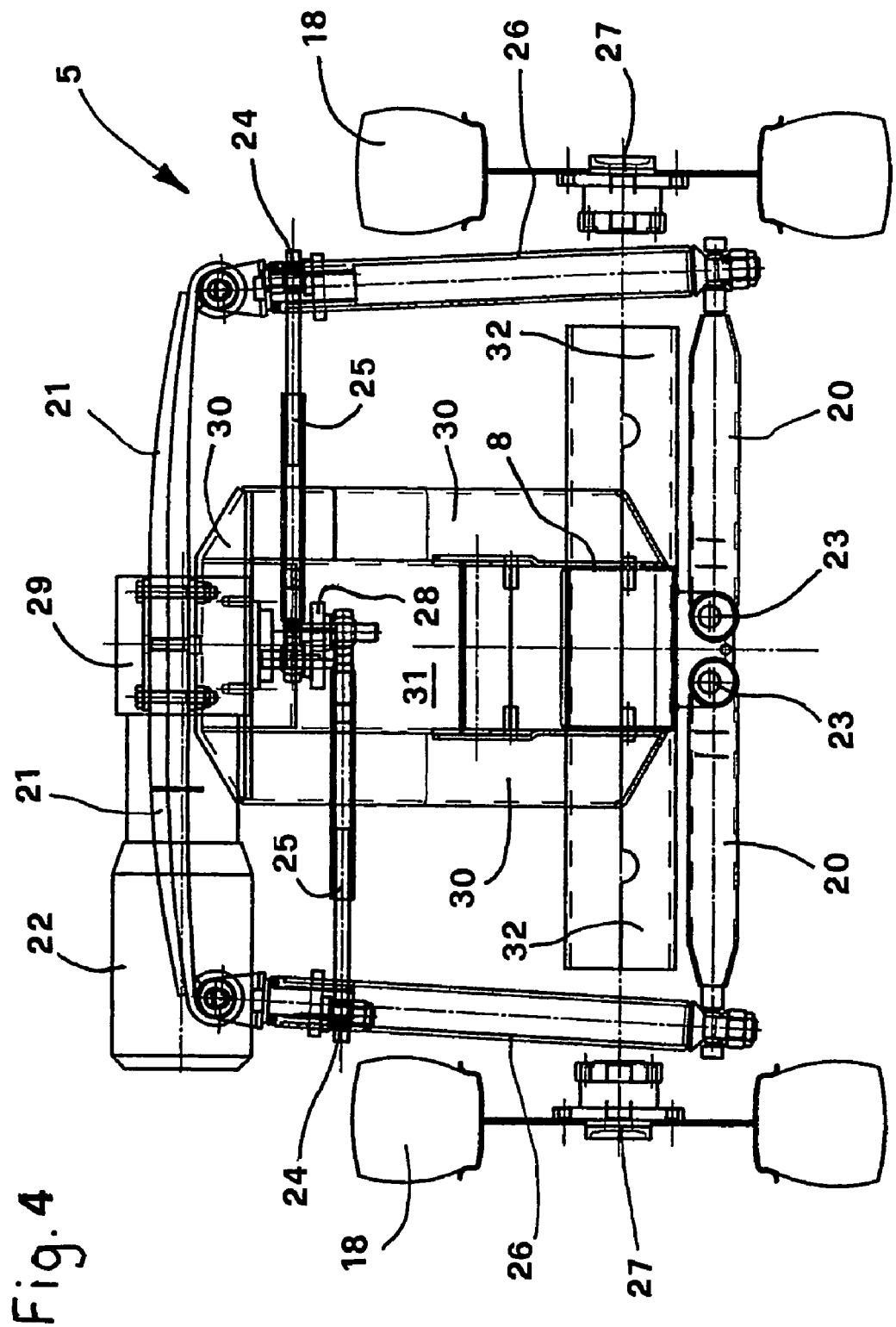
FIG. 4 is a schematic front view limited to the parts of the front suspension and of the steer.

In FIGS. 3 and 4 it is possible to see the horizontal pivoting pins 23 of the arms 20 and the links 24 of the tie rods 25 of the steer; moreover, it is also possible to see the sub-vertical and rigid uprights 26, for supporting the hubs 27 of the wheels 18.

Just in FIG. 4, furthermore, it is possible to see the connection plate 28 of the tie rods 25 to the reducer 29 of the steering actuator; this actuator is rigidly connected to the supporting structure 30 of the frame 8 which also supports the upper arms 21, advantageously consisting of a leaf-spring to make the reaction on the top of said uprights 26 elastic and to thus spring the front axle of the machine. Moreover, said supporting structure 30 has a space 31 for allowing the passage of the suction duct 6, not depicted here. Finally, there are side brackets 32 for supporting the two battery packs 7 in the frame 8, behind the front axle 5.

Figure 5:
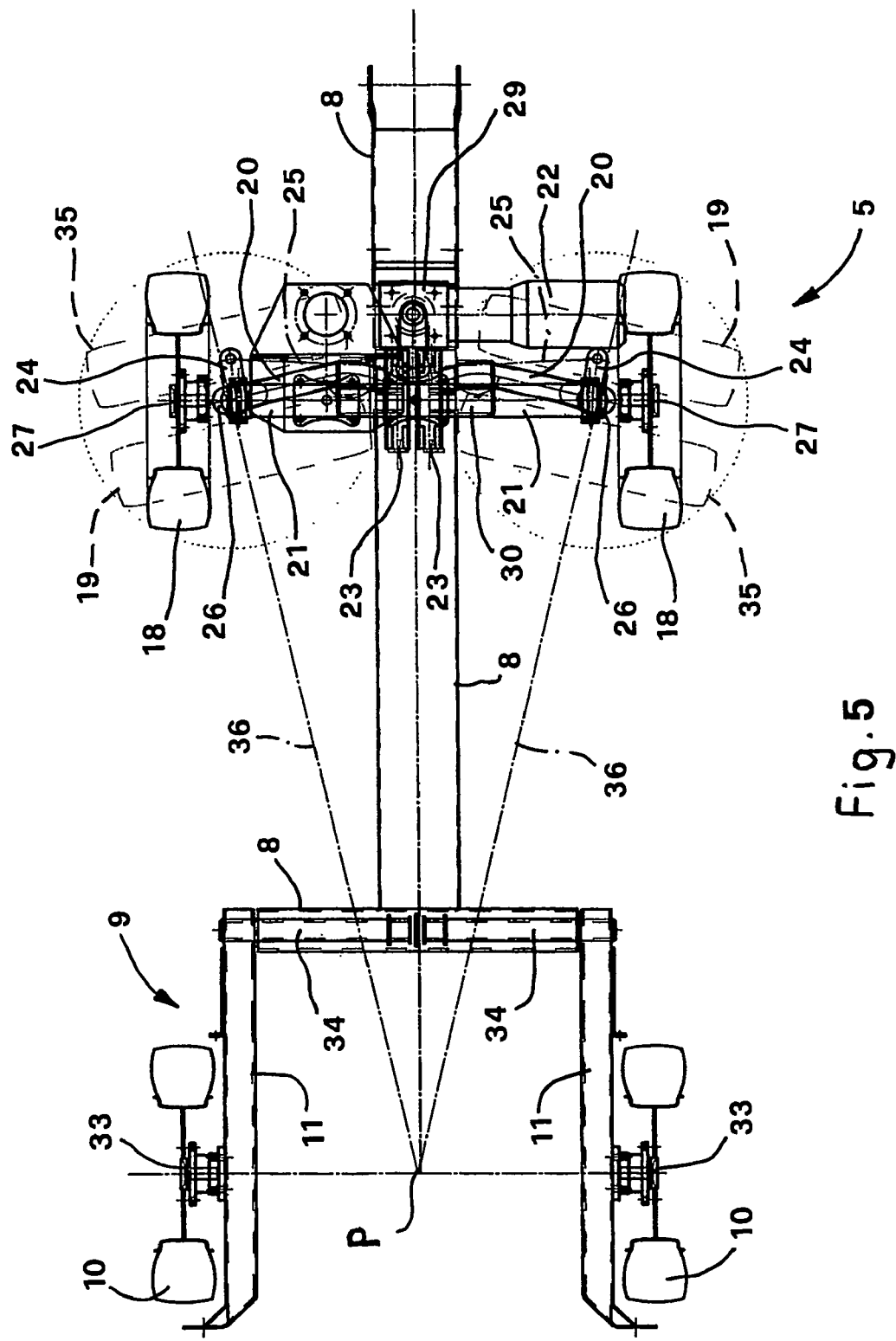
FIG. 5 is a schematic plan view of the frame with just the rear axle and the front axle with the parts of the suspension and of the steer.

In FIG. 5, finally, it is possible to see the configuration of the rear axle 9 where the wheels 10 are connected in rotation with the hubs 33 to the oscillating arms 11 in turn coupled with the frame 8 through torsion bars 34; the maximum left steering position 19, as can clearly be seen, is at the maximum possible size like the right steering 35, indeed, in both cases the axle of the wheels 36 extends to reach the mid-point P of the rear axle 9.

Figure 6:
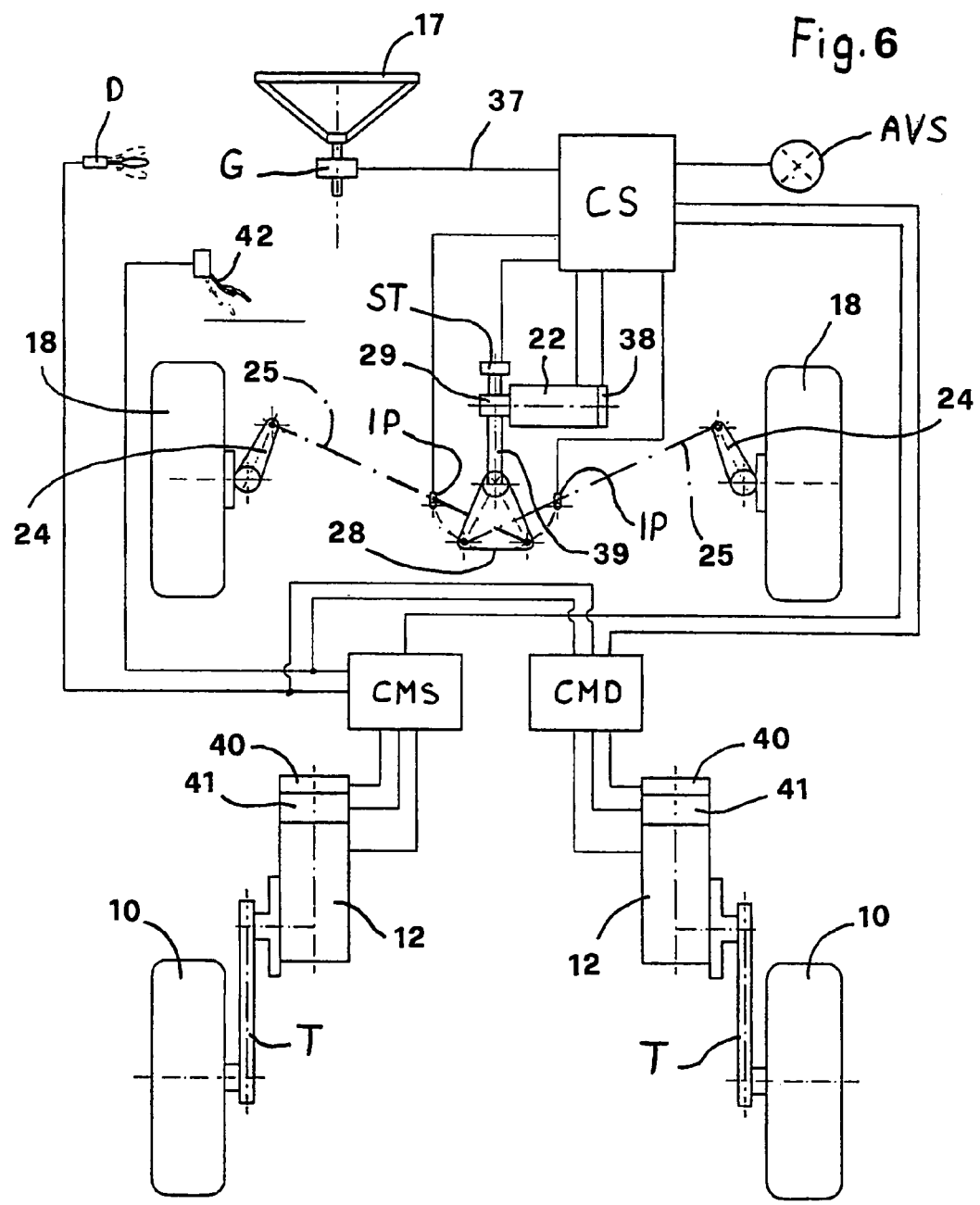
FIG. 6 is a block diagram of the connections between the command members of the driver, steering wheel, forward/reverse gear selector and accelerator pedal, and the actuators for the steering on the front wheels and of the traction motors on the rear wheels of the sweeper.

In FIG. 6, the steering wheel 17 is connected in rotation with the electronic signal generator G to constitute said control sensors, and in turn connected through the double cables 37 to the electronic steer station CS, to constitute the logic control apparatus; these double cables are each shielded and protected by a metal sheath as well as housed in two separate ducts with different paths; said station CS controls the ratiomotor 22, 29 to constitute said actuator, equipped with a rotation sensor 38, consisting of a three-phase asynchronous motor controlled in frequency and current; moreover, said station CS receives the rotation and position signal of the steer from the sensor ST connected to the shaft 39 of the plate 28; finally, two proximity switches IP, advantageously with magnetic effect, detect the right and left end stop position in the steering.

The steering control system consists of sensors (G) of the control action which send (37) the signal to the control logic apparatus (CS) which takes care of sending the actuation signal to the ratiomotor (22, 29), advantageously with a three-phase ac motor, and finally the sensors of the position reached (ST, 38 and IP) in steering produce the feedback on said control logic apparatus (CS).

Still in FIG. 6 it is possible to see the traction control unit comprising the geared motors 12 connected with the transmission T to the respective rear wheel 10; these motors are equipped with a respective electrical rotation sensor 40 and with an electromagnetic brake 41; each geared motor 12 is connected to the respective electrical control station CMS for the left-hand motor and CMD for the right-hand motor: the drive direction signal from the selector D, the signal from the pedals 42 and also to signal from the steer sensor ST arrive at said stations in parallel to balance the traction action between the two motors, through said steer station CS. This station CS, when an operating error has been detected also warns the user of possible blocking or alarms in the steering through the visual/sound alarm AVS in the cabin.

Figure 7:
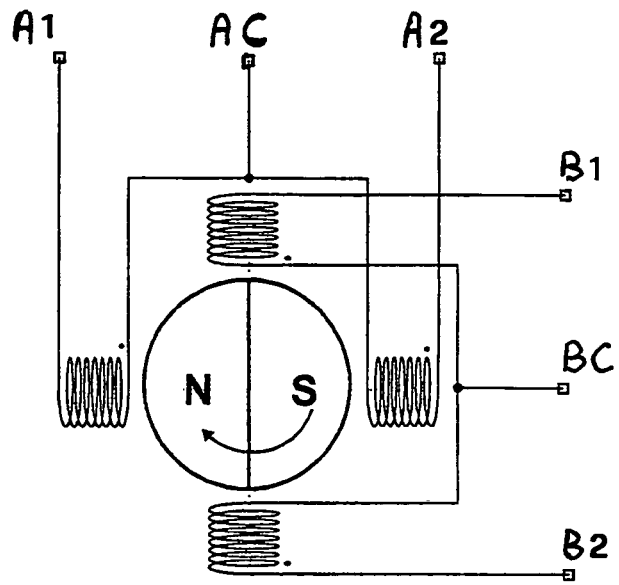
FIG. 7 is a circuit diagram of the sensor on the steering wheel.

In FIG. 7 it is possible to see the steer control sensor G consisting of a stepper motor, i.e. equipped with two pairs of windings arranged in quadrature: the first pair A1-AC with B1-BC and the second pair A2-AC with B2-BC. They are stator windings of the motor which, put under the action of the permanent magnet N-S, generate similar signals in opposition to each other so as to be comparable with a double encoder pair. The presence of the double sensor, i.e. the two pairs, and the presence of the double connection cables 37 to the steer station CS allow the redundancy of signal between the steering wheel 17, rigidly connected in rotation with the permanent Magnet N-S of the sensor G, and said station CS to ensure the connection between the steering wheel and said station even in the presence of malfunction in one of the pairs of windings of the sensor G or damage to one pair of cables 37.

Figure 8:
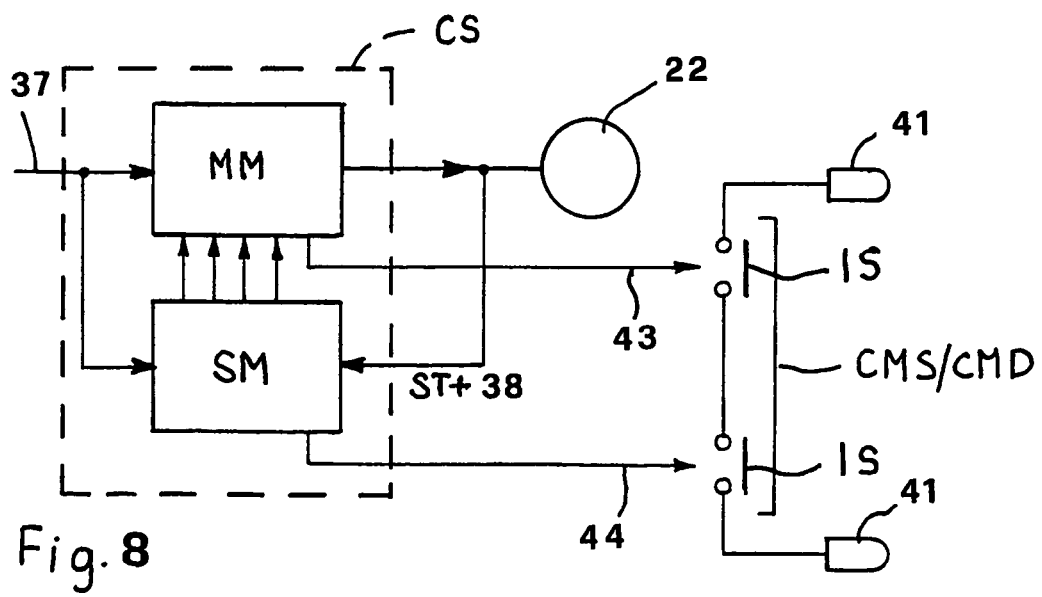
FIG. 8 is a block diagram of the connections between the components of the electrical steering control circuit and the connection to the braking devices in the traction circuit.

The structure of the steer station CS is depicted in FIG. 8 in which the signal coming from G is sent to the main microprocessor MM and to the supervising microprocessor SM present in this station; the main microprocessor MM takes care of sending to the ratiomotor 22, 29 the command necessary for the actuation of the steering rods, 24 and 25. The reply to the set command returns to the supervising microprocessor SM with the feedback of the actual carrying out of the command from the rotation and position sensor of the steer ST and from the rotation sensor 38 on the ratiomotor. When an operating error is detected the station CS acts keeping the steer command already set and acting, with double circuit 43 and 44 by each of said microprocessors MM and SM, on two safety switches IS in parallel, to realize the redundancy of intervention and to avoid the sticking of a switch not allowing safety braking, which intervene on the electromagnetic brakes 41 of the traction ratiomotors 12 realizing rapid and controlled braking.

By providing the frame 8 with the lifter 14 and the rear axle 9 open to receive the container 13 a high degree of handling is realized with the user being able to carry out the maneuver of replacing the container 13, unloading the full and loading the empty. Moreover, the position of the side brackets 32 for supporting the respective batteries 7 eases the replacement of the batteries themselves when the sweeper is brought up to a roller group for loading/unloading said batteries. In use, the lifetime of the batteries, also due to the substantial absorption due to sucking, was not greater than two hours of continuous work; therefore the replacement of these batteries has been foreseen and made easier.

The front axle 5 due to its configuration has an arrangement of the suspension to allow the maximum useful rotation of the wheels for steering; indeed the wheels 18 can take up the position 19 for steering to the left and 35 for steering to the right. In the two cases the maximum possible rotation is reached, i.e. with the center of curvature coinciding with the mid-point P of the rear axle 9.

Such a rotation is possible due to the arrangement of the upper arms 21 at a height greater than the bulk in height of the front wheels 18 and for the curved configuration of the lower arms 20 to receive the inner wheels 18 in the curvature, which are rotated beyond the right angle. Finally, the substantial height between the pairs of arms 20 and 21 allows the passage of the suction duct 6, so as to reduce the overall bulk of the machine.

The operation of the electrical steering unit takes place with the steering wheel 17 which is slightly braked to give the user the sensation of resistance when acting upon said steering wheel, avoiding overly quick turns and involuntary rotations. The control signal generator G is connected with said double cables to the steer control station CS which also receives the return signals from the rotation sensors 38 of the ratiomotor 22 and ST and from the position and rotation sensors of the steer drive shaft, thus being able to carry out the checking of the commanded action. The traction control unit, on the other hand, is divided and mirror-like on the two geared motors 12 to be able to act based upon the position of the steer detected by the sensor ST and to allow up to the counter rotation of the motors necessary for maximum steering, i.e. as stated with the center of rotation at P.

The control signal generator G, FIG. 7, has a stepper motor used as an impulse generator. It can be connected to a pair of encoders; indeed, the two pairs of stator windings in quadrature are magnetically coupled with the permanent Magnet N-S rotor, thus when the rotor is connected in rotation with the steering wheel 17, for each angular position the reply of this impulse generator shall vary. The presence of the double windings, and also of the double connection cables 37, allows said redundancy of the signal to be obtained to avoid possible errors in operation or data transmission to the station CS. Moreover, the reply signal of said sensor G depends upon the speed of rotation of the steering wheel; at a low speed the signal is less frequent, whereas at a high speed it is more frequent, but also with a greater amplitude. Therefore, the determination of the frequency can be checked with a measurement of the amplitude of the signal; indeed, if in the frequency determination there is continuous switching on one channel with another at rest, the case of a short-circuit of an earth channel can immediately be detected (large amplitude on a signal which continues to switch and nothing on the other); or else, in the case of jumps in the measurement of impulses due to the position of the stepper motor near to a transmission zone on a channel (practically zero amplitude on both channels). With a single encoder it would not be possible to discern between the aforementioned errors leaving ambiguity of interpretation.

In the action of commanding the station CS for controlling the steer, the main microprocessor MM calculates which controlling action is to be applied to the steer motor 22 based upon the command on the steering wheel 17. The control variables are the concatenated phase voltages which are applied to the three-phase asynchronous motor, thus after the calculations thereof the speed of rotation of the motor shall be modulated by acting upon the frequency and the torque shall be controlled by acting upon the amplitude of the voltages applied to the phases of the motor. The control is of the open loop type, with frequencies proportional to the speed of rotation of the steering wheel and the stopping of the steering action shall be carried out by the user when the machine has taken up the desired configuration.

Finally, with the arrangement of the double microprocessor MM and SM many operating diagnostics of the parts used are possible, allowing the checking whether or not there is an error and allowing the traction to be blocked with controlled braking, by acting on the safety switches IS and on the electromagnetic brakes 41; the steering is not modified in the alarm stopping step because there is no feedback typical of controls in closed loop which, with the information corrupted by an error, would cause a sudden change in the command; this would be unacceptable in steering control because it would cause the sudden variation of the set curve.

Therefore, the supervising microprocessor SM carries out a diagnostic monitoring activity in feedback on the command action generated by MM, checking whether the sign of the frequency of the command of MM is compatible with the detected data on the rotation of the motor 22; moreover, SM carries out the function of checking the periodicity of the commands of MM to the motor 22 and in the lack of the reply impulse to the command, the microprocessor SM sends the steering into lock, stopping all modifying actions and stopping the sweeper with controlled braking.

The advantages obtained by this invention are: the configuration of the sweeper 1 is compact and easy to use, being able to work with larger refuse containers 13 than the other small sweepers present on the market. This is due to the configuration of the rear axle 9 which houses said container between the wheels 10. Moreover, the rotating brushes 3 and the suction mouth 4 are arranged under the cabin so as not to encumber the front of the machine. Thus the suction mouth 4 is arranged practically below the users seat and has the suction duct 6 passing between the arms 20, 21 of the front steering axle 5. Furthermore, the configuration and arrangement in height of these arms allows the front wheels 18 to steer with the maximum possible angle: with the center of the curve in the mid-point P of the rear axle 9. The electrical traction with two geared motors 12, one per wheel 10, also allows said curve to be made if these geared motors are commanded based upon the position of the steering shaft 39 and of the wheels 18 until the backward rotation of the rear wheels 10. The side stowage arrangement of the batteries 7 on the side brackets 32 allows rapid replacement thereof without having to lift them, but by making them slide on a suitable roller group, when the sweeper is next to the roller group.

Furthermore, the adoption of the stepper motor used as an impulse generator is very advantageous since it has totally passive and therefore substantially strong circuitry. Consequently, this stepper motor, as an impulse generator, is not subject to disturbances, electrostatic discharges, overvoltages, short-circuits or other, i.e. it has less sensitivity to breakdown. Finally, this stepper motor has redundancy of the signal, which doubles the certainly of supplying the steer control information to the station CS. The ratiomotor 22, 29 of the steer actuator, when using an ac three-phase electric motor, also allows checking of the direction of rotation and speed of rotation with a comparison of the voltages on at least two stator windings.

In the practical embodiment, the materials, the sizes and the details can be different from those indicated, but technically equivalent to them, without for this reason departing from the legal scope of the present invention. Thus, the electric steering command unit can, advantageously, also be applied to machines with traction having a diesel engine and hydrostatic and electrical transmission of the power to the wheels 10. These sweepers can be used in expansive and open spaces like streets and large urban or industrial areas.

Said traction motors 12, for a greater energy saving, instead of the usual electrical motors with a collector can be ac traction motors, commanded with a power inverter controlled in frequency and current arranged in each station CMS and CMD.

Finally, although less advantageously, the motor of the actuator of the steer can be in direct current instead of said ac three-phase motor.

The invention claimed is:

1. A self-propelled sweeper comprising:
   a rear axle and a refuse container housed on the rear axle,
   a frame suitable for receiving said refuse container,
   a waste collection member,
   suction members which comprises a suction mouth and a suction duct,
   a suction and filtering unit,
   steer control members for steering the sweeper,
   a cabin with a driving position, and
   a front steering axle including upper arms, lower arms and an inner front wheel, and allowing a rotation of the inner front wheel when cornering beyond a right-angle, said front steering axle being supported by arms of a suspension of which the upper arms are arranged at an upper level which is higher than a maximum height of a wheel of the front steering axle, steer linkages also being arranged at said upper level, and the lower arms being shaped to receive said inner front wheel in a position of maximum curvature,
   wherein said container is supported at engagement and attachment members to said suction and filtering unit; said rear axle having a U-shaped plan for receiving said refuse container; and
   wherein said front axle includes a supporting structure rigidly connected to the frame to support said upper arms of the suspension and a space to allow a passage of the suction duct from the suction mouth to the suction and filtering unit.

2. The self-propelled sweeper, according to claim 1, wherein the frame which joins the front axle and the rear axle is box-shaped with a central beam.

3. The self-propelled sweeper, according to claim 1, wherein said rear axle is realized with oscillating arms for supporting rear wheels connected in oscillation to the frame through torsion bars advantageously housed in a common oscillation pin itself.

4. The self-propelled sweeper, according to claim 1, wherein the rear axle is equipped with individual traction motors of an electrical type for each rear wheel of the rear axle.

5. The self-propelled sweeper, according to claim 4, wherein said traction motors of the electrical type, are each equipped with a rotation sensor and an electromagnetic braking sensor.

6. The self-propelled sweeper, according to claim 5, wherein said traction motors of the electrical type in three-phase alternating current are controlled in frequency and current by individual electronic control stations for each traction motor.

7. The self-propelled sweeper, according to claim 6, wherein said electronic control stations for each traction motor each include two microprocessors of which only one is for actuation and only one is for checking and monitoring a command for the actuation and an effect of the command, with at least one feed back sensor on each traction motor, to realize an open loop control.

8. The self-propelled sweeper, according to claim 1, wherein the driving position in the cabin includes steer control members,
   wherein a steer actuator of the steer control members includes an electric motor connected to said steer control members through a steer control station for steering with a function of actuating and controlling the steering; and
   wherein a connection between the steer control members and said steer control station is realized by a connection with a double sensor and double connection cables arranged on physically different paths, mechanically shielded and protected from possible damage.

9. The self-propelled sweeper, according to claim 8, wherein the steer control members include a steering wheel which is slightly braked to give a user a sensation of resistance when acting upon said steering wheel, avoiding overly quick turns and involuntary rotations.

10. The self-propelled sweeper, according to claim 8, wherein the steering control station includes two microprocessors of which only one is for actuation and only one is for checking and monitoring a command for the actuation and an effect of the command, with at least one feedback sensor on said electric motor or on a steer rotation shaft connected to the electric motor, to realize an open loop control.

11. The self-propelled sweeper, according to claim 10, further comprising a traction control circuit controlling traction motors of the rear axle, and a steering control circuit including the steer control station,
   wherein the steer control station is connected with two connection lines, one actuated by the actuation microprocessor and the other by the checking and monitoring microprocessor, to safety switches foreseen in the traction control circuit, to act upon braking members of the traction motors and to ensure correct emergency braking in blocking, error or emergency actions of the steering control circuit.

12. The self-propelled sweeper with electrical steering, according to claim 10, wherein said electric motor includes an ac motor controlled in frequency and current by said actuation microprocessor.

13. The self-propelled sweeper, according to claim 8, wherein a stepper motor with a rotor, a permanent magnet on the rotor and a double pair of stator windings are physically staggered at a right angle to constitute a generator of control signals for said steer actuator of steering control members; each pair of stator windings being connected to one of said double connection cables with the steer control station.

* * * * *